United States Patent
Rosepiler et al.

(10) Patent No.: US 11,046,365 B2
(45) Date of Patent: Jun. 29, 2021

(54) SUBFRAME DISENGAGEMENT APPARATUS

(71) Applicant: Honda Motor Co., Ltd., Tokyo (JP)

(72) Inventors: Stephen G. Rosepiler, Marysville, OH (US); Shivaprasad G. Rangaswamaiah, Dublin, OH (US); Gregory B. Resh, Ostrander, OH (US); David J. Royak, Broadview Heights, OH (US); Sartaj S. Ubhi, Dublin, OH (US); Michael J. Zimcosky, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 108 days.

(21) Appl. No.: 16/278,335

(22) Filed: Feb. 18, 2019

(65) Prior Publication Data

US 2020/0262484 A1 Aug. 20, 2020

(51) Int. Cl.
*B62D 21/15* (2006.01)
*B62D 27/06* (2006.01)

(52) U.S. Cl.
CPC ......... *B62D 21/155* (2013.01); *B62D 27/065* (2013.01); *B60G 2206/60* (2013.01)

(58) Field of Classification Search
CPC ...... B62D 21/155; B62D 21/15; B62D 21/11; B62D 21/152; B62D 27/065; B62D 27/06; B62D 29/008; B62D 25/082; B62D 25/2018; B62D 25/2027; B62D 25/2009; B62D 25/20; B62D 25/085; B60G 2206/60; B60R 2021/0004

USPC ........ 280/784, 124.109; 296/187.09, 187.11; 180/299, 312

See application file for complete search history.

(56) References Cited

U.S. PATENT DOCUMENTS

| | | | | |
|---|---|---|---|---|
| 4,450,926 A | * | 5/1984 | Suzuki | B62D 25/20 180/297 |
| 5,997,276 A | | 12/1999 | Torazawa et al. | |
| 7,108,092 B2 | * | 9/2006 | Suwa | B60K 11/04 180/68.4 |
| 8,500,191 B1 | | 8/2013 | Baccouche et al. | |
| 8,613,461 B2 | | 12/2013 | Young et al. | |
| 8,851,223 B2 | * | 10/2014 | Yamashita | B62D 21/155 180/291 |
| 9,096,276 B2 | | 8/2015 | Komiya | |
| 9,650,074 B2 | | 5/2017 | Shirooka | |
| 9,776,663 B1 | | 10/2017 | Craig et al. | |
| 10,040,483 B2 | | 8/2018 | Matsuura et al. | |

* cited by examiner

*Primary Examiner* — Keith J Frisby
(74) *Attorney, Agent, or Firm* — American Honda Motor Co., Inc.; Morgan Lincoln

(57) ABSTRACT

A disengagement apparatus for a subframe of a vehicle includes an inclined wall having an inclined surface, two sidewalls, and a top wall. The inclined surface has a structural feature that may include a rib. The disengagement apparatus is configured to couple to the subframe and a subframe stay. The subframe may include an aluminum material, and the disengagement apparatus may include a steel material. Further, a front frame structure for a vehicle includes a vehicle body, and a subframe structure coupled to the vehicle body that includes a subframe, a subframe stay, and a disengagement apparatus. The subframe structure is configured to decouple from the vehicle body in the event of a frontal impact and deflect in a rearward and downward direction relative to the vehicle body.

7 Claims, 5 Drawing Sheets

SUBFRAME DISENGAGEMENT APPARATUS

BACKGROUND

Vehicles are often constructed using a vehicle body and various frame components, such as a subframe, coupled to one another. In one configuration, passengers are enclosed within the vehicle body, and suspension and drivetrain components are coupled to the subframe. Materials used to construct each of the vehicle body and subframe may be chosen based on various characteristics, such as strength, weight, and manufacturability. For example, high strength steel may be chosen for a vehicle body to increase strength, while cast aluminum may be chosen for a subframe to reduce weight. The vehicle body and subframe may be coupled to one another using bolts, welded joints, or other known fastening methods.

Configuration of the interface between the vehicle body and subframe may be further optimized to encourage a specific behavior of the subframe relative to the vehicle body in an event of an impact, such as a frontal impact. Specifically, it may be desirable in some instances to obtain movement of the subframe away from the vehicle body during the frontal impact.

In a configuration wherein the vehicle body and subframe both comprise the same material, such as steel, individual material strength characteristics may not be a notable variable in determining how the two components will interact upon contact with one another. However, in a configuration wherein the vehicle body and subframe each comprise a different material, such as aluminum and steel, a difference in the strength characteristics of each material may increase the relevance of this variable in determining how the two components will interact upon contact. In other words, the behavior of a steel subframe contacting a steel vehicle body is often easier to simulate than, for example, an aluminum subframe contacting a steel vehicle body.

Subsequently, since it may be desirable to provide a configuration wherein the material of the subframe differs from the material of the vehicle body, there is a desire for a subframe component disposed at an interface of the subframe and vehicle body that provides for more predictable behavior upon contact of the subframe with the vehicle body (i.e., directing a subframe away from a vehicle body).

BRIEF SUMMARY

According to one aspect, a disengagement apparatus for a subframe of a vehicle includes an inclined surface, two sidewalls, and a top wall. The inclined surface has a structural feature. The disengagement apparatus is configured to couple to the subframe and a subframe stay.

According to another aspect, a subframe structure for a vehicle includes a subframe, a subframe stay, and a disengagement apparatus. The subframe comprises an aluminum material. The disengagement apparatus comprises a steel material, has an inclined surface, and is configured to couple to the subframe and the subframe stay.

According to another aspect, a front frame structure includes a vehicle body and a subframe structure. The vehicle body includes an inclined body surface at a front lower portion. The subframe structure includes an inclined subframe surface at a rear upper portion. The inclined body surface and the inclined subframe surface are adjacent one another. In the event of a frontal impact, the subframe structure is configured to decouple from the vehicle body and deflect in a rearward and downward direction relative to the vehicle body.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

With reference now to the figures wherein the illustrations are for purposes of illustrating one or more exemplary embodiments and not for purposes of limiting the same, there is shown a disengagement apparatus for a subframe of a vehicle.

Figure 1:
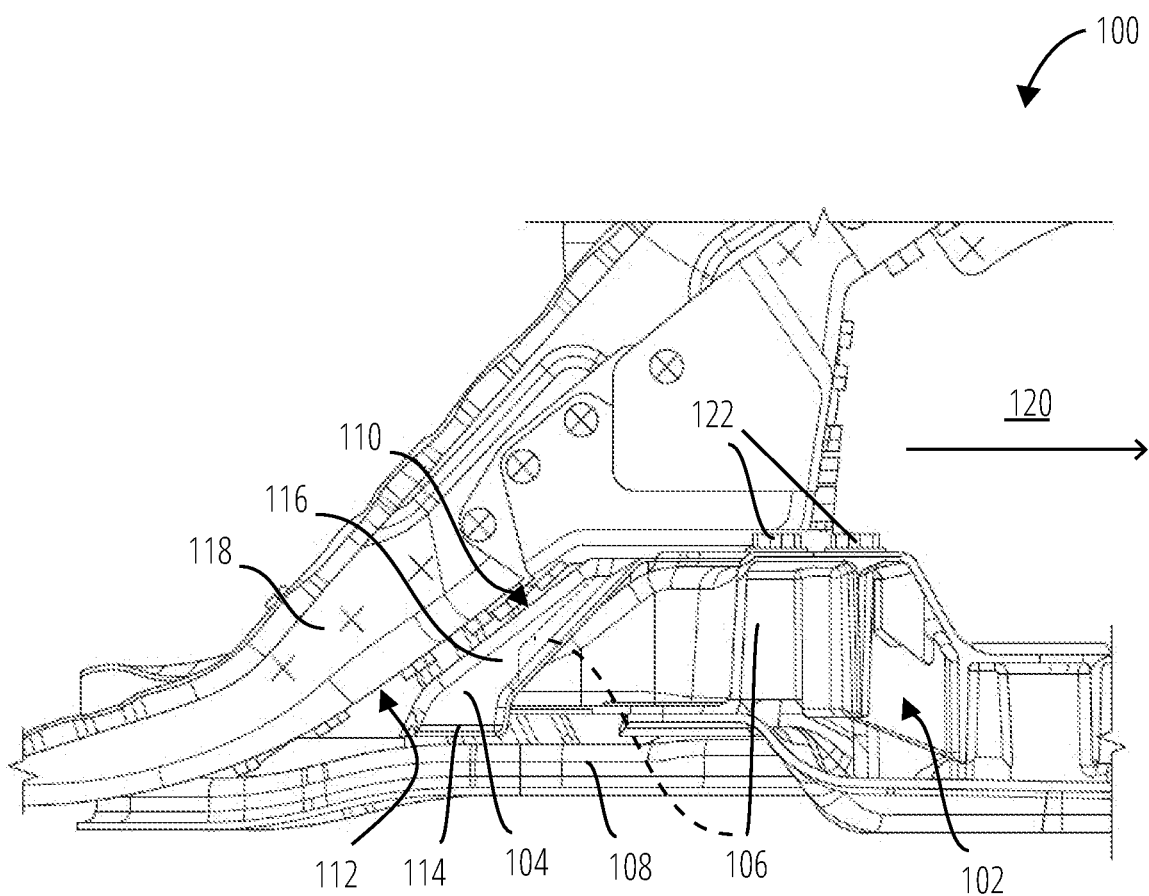
FIG. 1 is a side view of a front frame structure of a vehicle according to an exemplary embodiment.

FIG. 1 is a side view of a front frame structure 100 of a vehicle according to an exemplary embodiment. The front frame structure 100 includes a subframe structure 102 and a portion of a vehicle body 118. The vehicle body 118 is a structure that defines an interior cabin space, and the portion of the vehicle body 118 that is shown, more specifically, is a front lower portion of the vehicle body. The interior cabin space is where passengers and/or cargo being transported by the vehicle may be contained. As used herein, "front" and "rear" are relative to an orientation of a driver and front passenger seat within the vehicle (e.g., an occupant of each of the driver and front passenger seat will face towards the "front" of the vehicle). To provide further clarification, a travel direction 120 shown in FIG. 1 is a forward direction of travel of the vehicle relative to the seating orientation of the driver and front passenger seat. The vehicle body 118 further includes an inclined body surface 112 on the front lower portion. The inclined body surface 112 is disposed on a front lower surface of the front lower portion. The vehicle body 118 may comprise a steel material in one embodiment, such as a high strength steel, or may comprise another metal such as aluminum in other embodiments.

The subframe structure 102 includes a subframe 106, a subframe stay 108, and a disengagement apparatus 104 in the exemplary embodiment. The subframe 106 and subframe stay 108 each couple to the vehicle body 118. The subframe 106 and subframe stay 108 also couple to each other. The disengagement apparatus 104 couples to both the subframe 106 and subframe stay 108, and is further disposed between the subframe 106 and the vehicle body 118. To clarify, as used herein "couple" means to fasten (i.e., via a bolt, weld, adhesive, etc.). The disengagement apparatus 104 further includes an inclined subframe surface 110 at a rear upper portion, a bottom plate 114 at a rear lower portion, and two sidewalls 116. The inclined subframe surface 110 may be substantially parallel to the inclined body surface 112. The subframe 106 and subframe stay 108 may comprise an aluminum material, such as a cast aluminum structure or a stamped aluminum sheet, or may comprise a steel material, such as a high strength steel, for example. The disengagement apparatus 104 may comprise a steel material, such as high strength steel, or may comprise an aluminum material in other embodiments so long as that the strength of its material is greater than the strength of the material of the subframe 106.

The components of the front frame structure 100 may be coupled to one another using one or more bolts 122. Alternatively, the components may be coupled using other known fastening methods, such as welding, for example.

Figure 2:
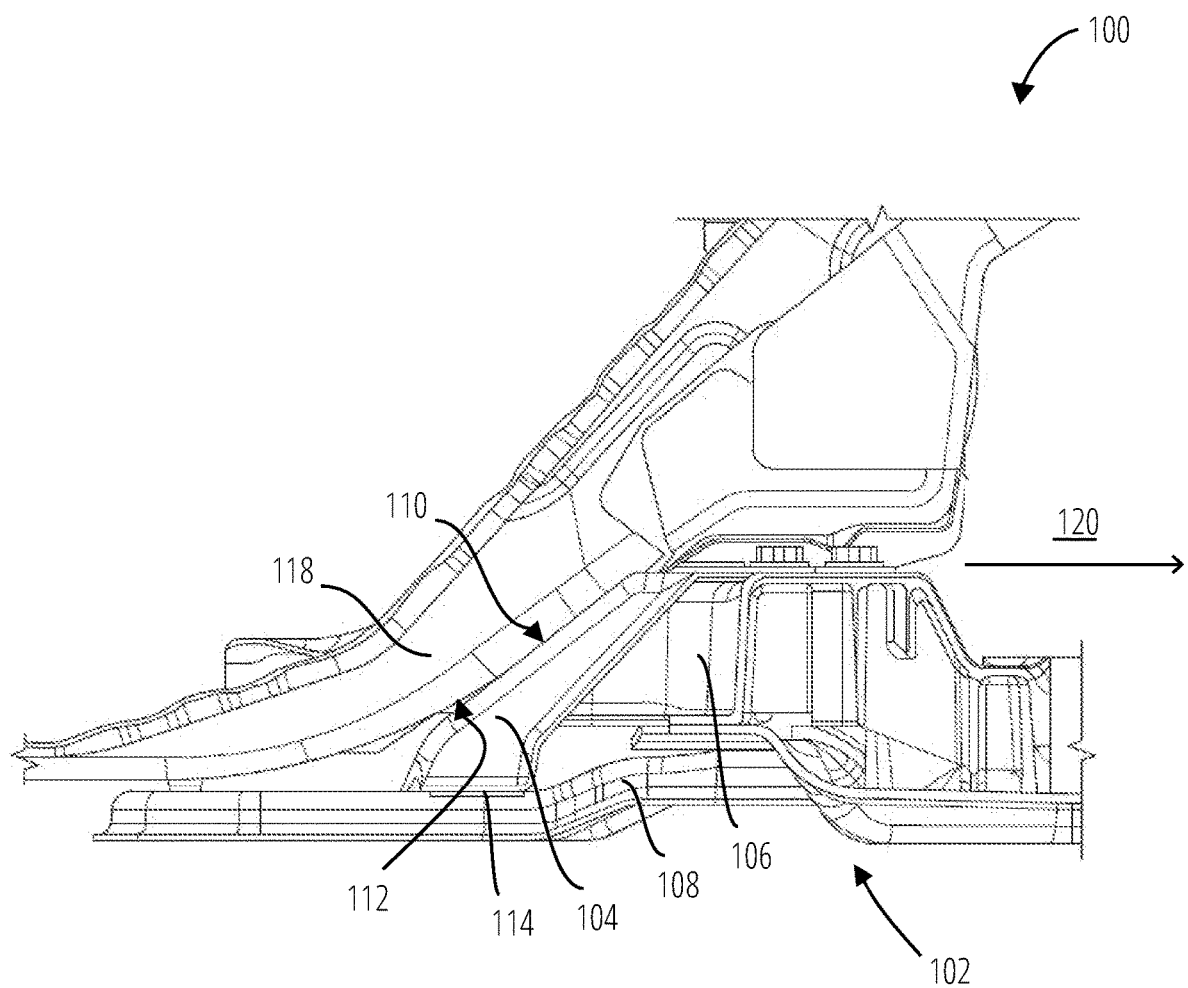
FIG. 2 is a side view of the front frame structure provided in FIG. 1, wherein the subframe structure is decoupled and shifted rearward and downward.

FIG. 2 is a side view of the front frame structure 100 provided in FIG. 1 wherein the subframe structure 102 is decoupled from the vehicle body 118 and shifted rearward and downward. This decoupling and shifting may occur during a frontal impact wherein a sudden force is imparted in a rearward direction on the front end of the vehicle. As previously stated the subframe structure 102 in the exemplary embodiment is coupled to the vehicle body 118 using a plurality of bolts 122. The rearward force of the frontal impact on the subframe structure 102 is configured to impart a shear stress on the bolts 122 and cause them to either break, or tear out of their respective mounting points on the subframe structure 102 and/or vehicle body 118. The bolts often tear out of their mounting points at the head of the bolt 122; however, they could also tear out at the shaft end. This breaking of the coupling points at the interface between the subframe structure 102 and vehicle body 118 causes the subframe structure 102 to decouple from the vehicle body 118. Once decoupled from the vehicle body 118, the subframe structure 102 may shift independent of the front lower portion of the vehicle body 118 that is depicted.

Between FIG. 1 and FIG. 2 specifically, a frontal impact has imparted a rearward force on the subframe structure 102 causing the subframe structure 102 to decouple from the vehicle body 118 (i.e., the bolts 122 have torn out of their respective mounting points on the vehicle body 118 and subframe structure 102), and also causing the subframe structure 102 to shift rearward until the disengagement apparatus 104, more specifically the inclined subframe surface 110, contacted the inclined body surface 112 of the vehicle body 118. After contacting the vehicle body 118, the rearward force and angle of contact between the inclined subframe surface 110 and inclined body surface 112 directed the decoupled subframe structure 102 to deflect downward into the position shown in FIG. 2. The disengagement apparatus 104 remains coupled to the subframe 106 and subframe stay 108 at the bottom plate 114. In the exemplary embodiment the disengagement apparatus 104 also remains coupled to the subframe 106 at the top wall 304 (shown in FIG. 3), however this may not occur in other embodiments (i.e., if the bolts 122 were to shear at their shaft). It is understood that this specific movement of the subframe structure 102 with respect to the vehicle body 118 as a result of a frontal impact is merely exemplary for the purpose of explaining a function of the disengagement apparatus 104.

Figure 3:
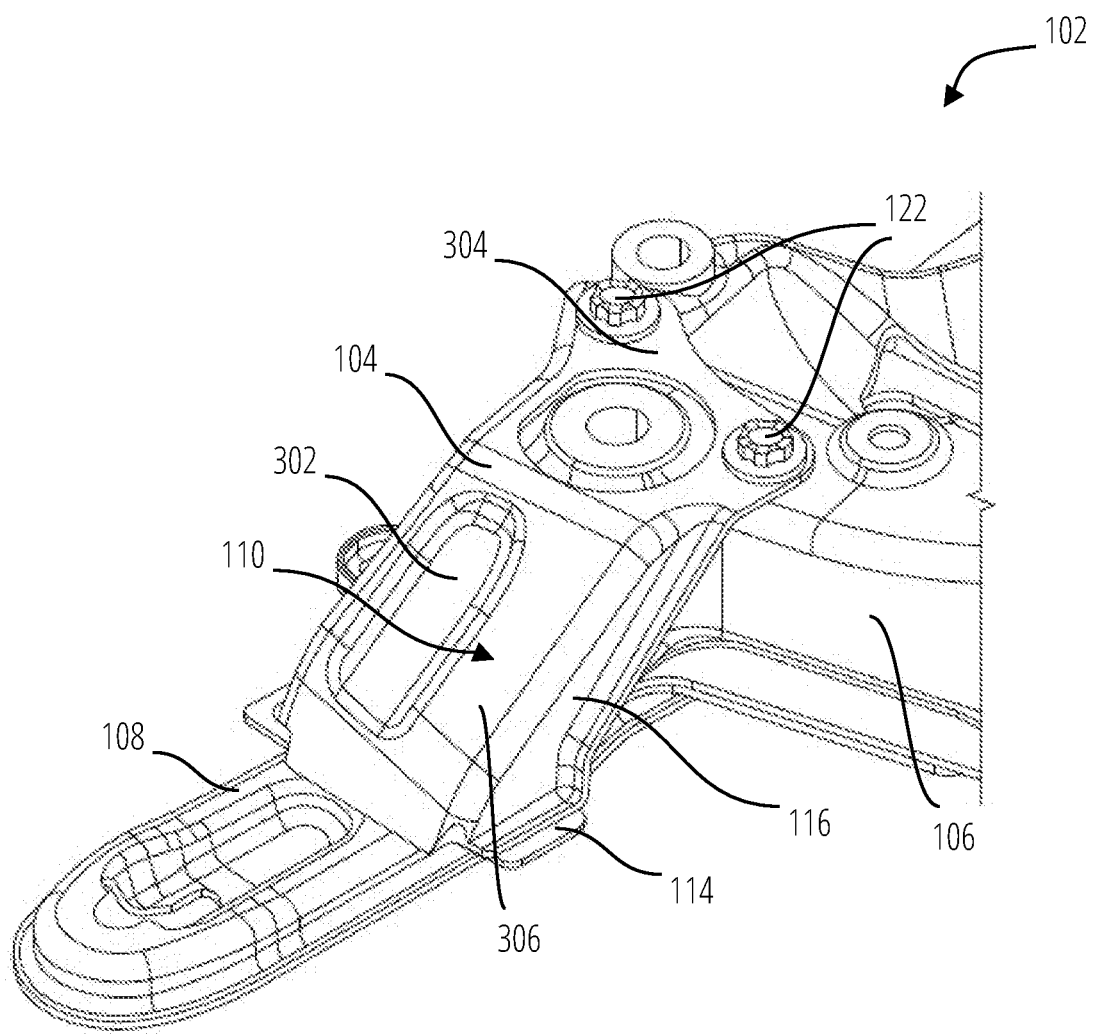
FIG. 3 is a perspective view of a subframe structure according to an exemplary embodiment.

FIG. 3 is a perspective view of a subframe structure according to an exemplary embodiment. The exemplary embodiment may be, for example, the subframe structure 102 provided in FIG. 1 that includes a subframe 106, subframe stay 108, and disengagement apparatus 104. As previously stated, the subframe 106 and subframe stay 108 may comprise an aluminum material, and the disengagement apparatus 104 may comprise a steel material in one embodiment. In other embodiments, the disengagement apparatus 104 may also comprise an aluminum material, so long as the strength of the material of the disengagement apparatus 104 is greater than the strength of the material of the subframe 106.

The disengagement apparatus 104 is coupled to each of the subframe 106 and the subframe stay 108 using bolts 122. In other embodiments, the disengagement apparatus 104 may be coupled to the subframe 106 and subframe stay 108 using other known methods, such as welding, for example resistance spot welding. The disengagement apparatus 104 is coupled to the subframe 106 at a top wall 304, and is coupled to the subframe stay 108 at the bottom plate 114. The bottom plate 114 may be formed integrally with the disengagement apparatus 104, or may comprise a separate plate that is coupled to each sidewall 116. If coupled to the sidewalls 116, the bottom plate 114 may be welded or bolted thereto. The disengagement apparatus 104 further includes an inclined wall 306 onto which the inclined subframe surface 110 is disposed. The inclined wall 306 extends between each of the sidewalls 116. The top wall 304 extends between each of the sidewalls 116 and the inclined wall 306.

The inclined wall 306 may further include a structural feature to provide an increase in strength. The structural feature is shown in the exemplary embodiment as a structural rib 302. The rib 302 is a projection disposed on the inclined wall 306 that may project either inward (e.g., toward the subframe 106) or outward (e.g., toward the vehicle body 118). Although one rectangular-shaped rib 302 is provided in the exemplary embodiment, other embodiments may include a different number (i.e., two) or shape (i.e., circular, triangular) of rib. Alternatively, the structural feature may comprise other methods of strengthening a sheet of metal, such as, for example, a dimple, brace, or supplemental sheet of metal disposed on the inclined wall 306.

Figure 4:
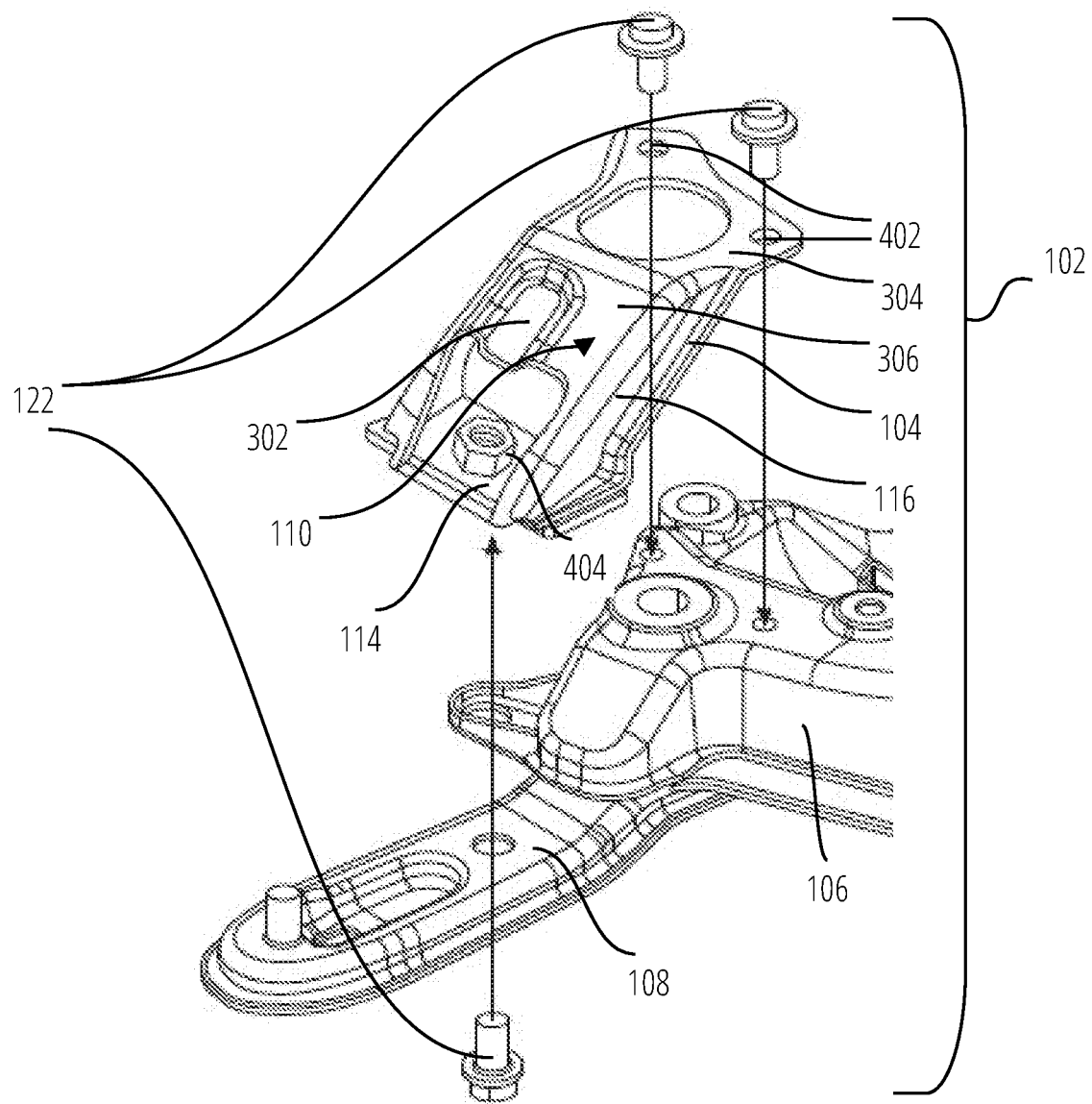
FIG. 4 is an exploded view of the subframe structure provided in FIG. 3.

FIG. 4 is an exploded view of the subframe structure 102. As previously stated, the disengagement apparatus 104 is bolted to each of the subframe 106 and the subframe stay 108. In the disclosed embodiment, two of the bolts 122 are each inserted into a through hole 402 defined in the top wall 304. In other embodiments, a different number of bolts (i.e., one bolt) may couple the disengagement apparatus 104 to the subframe 106. The disengagement apparatus 104 is also coupled to the subframe stay 108 using a bolt 122. More specifically, the subframe stay 108 is coupled to the bottom plate 114 of the disengagement apparatus 104. In FIG. 4 a portion of the inclined wall 306 is cut away to show the bottom plate 114 and a nut 404 to which the subframe stay 108 is coupled to the bottom plate 114, as will be described in more detail with respect to FIG. 5. In other embodiments, a different number of bolts (i.e., two bolts), may couple the disengagement apparatus 104 to the subframe stay 108. Additionally, it is understood that the subframe stay 108 is also coupled directly to the subframe 106 independent of the disengagement apparatus 104. In other words, although the disengagement apparatus 104 indirectly couples the subframe 106 to the subframe stay 108, the subframe 106 is also directly coupled to the subframe stay 108 at a separate location.

Figure 5:
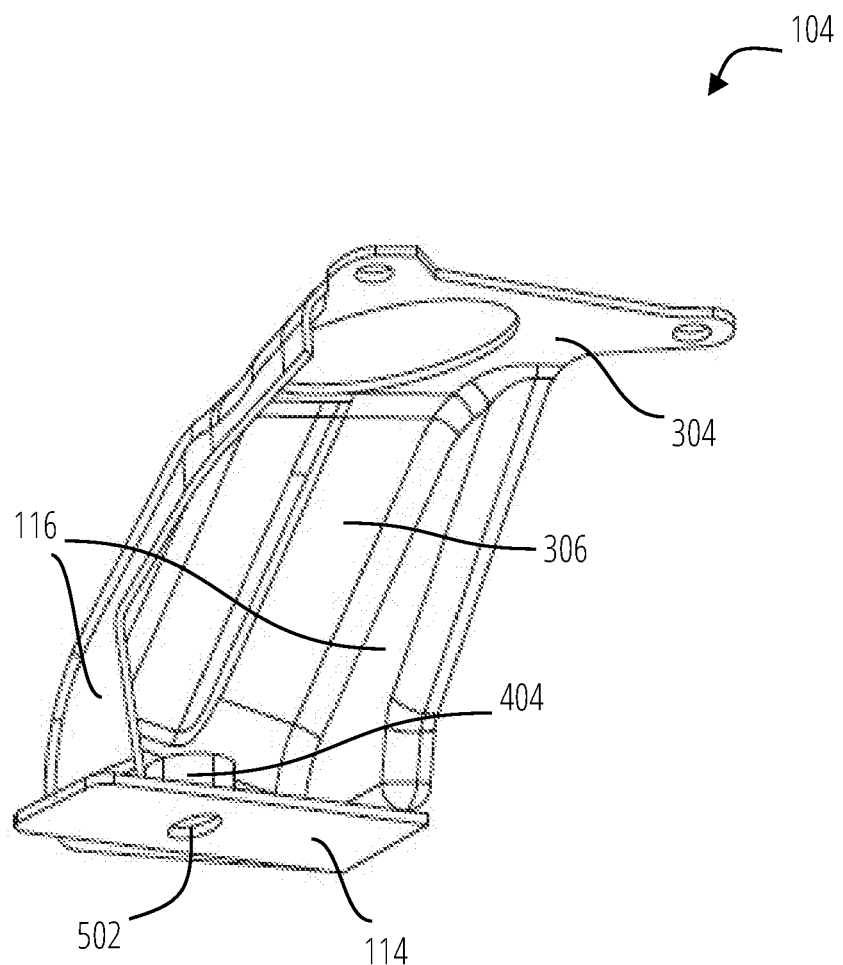
FIG. 5 is a bottom perspective view of disengagement apparatus provided in the structure of FIGS. 1 through 4.

FIG. 5 is a bottom perspective view of the disengagement apparatus 104. In the depicted embodiment, the nut 404 previously identified in FIG. 4 is disposed on an inner surface of the bottom plate 114 to provide a threaded through hole 502 for receiving the bolt 122 in order to couple the disengagement apparatus 104 to the subframe stay 108. In other embodiments, however, the bottom plate 114 itself may be threaded to receive the bolt 122, instead of utilizing a nut. Although one threaded through hole 502 is provided on the bottom plate 114 in the exemplary embodiment, other embodiments may include a different number of threaded through holes (i.e., two holes). As previously described, the bottom plate 114 is coupled to each of the sidewalls 116 and also to the inclined wall 306.

The foregoing detailed description of exemplary embodiments is included for illustrative purposes only. It should be understood that other embodiments could be used, or modifications and additions could be made to the described embodiments. Therefore, the disclosure is not limited to the embodiments shown, but rather should be construed in breadth and scope in accordance with the recitations of the appended claims.

What is claimed is:

1. A disengagement apparatus for a subframe of a vehicle, comprising:
    an inclined surface having a structural feature;
    two sidewalls;
    a top wall; and
    a bottom plate; and
    wherein the disengagement apparatus is configured to couple to the subframe and a subframe stay, the top wall includes a through hole defined therein, and the bottom plate includes a threaded through hole defined therein that is configured to receive a threaded shaft of a bolt.

2. The disengagement apparatus of claim 1, further comprising a steel material.

3. The disengagement apparatus of claim 1, wherein the subframe comprises an aluminum material.

4. The disengagement apparatus of claim 1, wherein the structural feature comprises a rib.

5. The disengagement apparatus of claim 1, wherein the bottom plate is coupled to each of the sidewalls.

6. The disengagement apparatus of claim 1, further configured to couple to the subframe at the top wall and to the subframe stay at the bottom plate.

7. The disengagement apparatus of claim 1, wherein the threaded through hole comprises a nut coupled to the bottom plate.

* * * * *